United States Patent
Toshimitsu et al.

(10) Patent No.: US 12,223,024 B2
(45) Date of Patent: Feb. 11, 2025

(54) APPROVAL SYSTEM

(71) Applicants: KABUSHIKI KAISHA TOSHIBA, Tokyo (JP); Toshiba Infrastructure Systems & Solutions Corporation, Kawasaki (JP)

(72) Inventors: Kiyoshi Toshimitsu, Tokyo (JP); Makoto Watanabe, Machida (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 184 days.

(21) Appl. No.: 17/731,396

(22) Filed: Apr. 28, 2022

(65) Prior Publication Data
US 2022/0253518 A1    Aug. 11, 2022

Related U.S. Application Data

(63) Continuation of application No. PCT/JP2020/043430, filed on Nov. 20, 2020.

(30) Foreign Application Priority Data

Nov. 26, 2019  (JP) .................................. 2019-213470
Mar. 4, 2020   (JP) .................................. 2020-036911

(51) Int. Cl.
   G06F 21/32    (2013.01)
   G06F 21/34    (2013.01)
(52) U.S. Cl.
   CPC .............. *G06F 21/32* (2013.01); *G06F 21/34* (2013.01)
(58) Field of Classification Search
   CPC .................................. G06F 21/32; G06F 21/34
   See application file for complete search history.

(56) References Cited

U.S. PATENT DOCUMENTS 6,481,140 B1 * 11/2002 Marshall ................. G06F 21/34
                                                    42/70.11
8,717,141 B2 *  5/2014 Eberhart .............. A61B 5/1171
                                                     340/5.2
(Continued)

FOREIGN PATENT DOCUMENTS

EP     2 806 370 A1    11/2014
JP    2002-101459 A     4/2002
(Continued)

OTHER PUBLICATIONS

Written Opinion issued on May 14, 2024, in corresponding Singapore Application No. 11202204778V, 13 pages.
(Continued)

*Primary Examiner* — Vance M Little
(74) *Attorney, Agent, or Firm* — Maier & Maier, PLLC

(57) ABSTRACT

According to one embodiment, an approval system includes an information processing apparatus and a biometric authentication device. The information processing apparatus includes a first interface and a first processor. The first processor is configured to: receive a sensor signal; when a state satisfying a predetermined condition related to data indicated by the sensor signal occurs, transmit an approval request signal to the biometric authentication device; and perform the countermeasure processing when an approval response signal is received from the biometric authentication device. The biometric authentication device includes a second interface, a storage unit, a biometric sensor, a second processor. The second processor is configured to: cause the biometric sensor to acquire the biometric information when the approval request signal is received; and transmit the approval response signal when the biometric information acquired by the biometric sensor and the biometric infor- (Continued)

mation stored in the storage unit are identified with each other.

5 Claims, 9 Drawing Sheets

(56) References Cited

U.S. PATENT DOCUMENTS

| | | | |
|---|---|---|---|
| 10,334,054 B2 | 6/2019 | Van Os et al. | |
| 2002/0109580 A1* | 8/2002 | Shreve | G07C 9/00309 340/5.74 |
| 2002/0138767 A1* | 9/2002 | Hamid | G06Q 10/02 340/5.82 |
| 2008/0019573 A1* | 1/2008 | Baltatu | H04L 63/0823 382/115 |
| 2015/0206366 A1 | 7/2015 | Divincent et al. | |
| 2015/0227734 A1 | 8/2015 | Mucci et al. | |
| 2017/0171201 A1 | 6/2017 | Matsugashita | |
| 2017/0339151 A1 | 11/2017 | Van Os et al. | |
| 2019/0180018 A1 | 6/2019 | Toshiba et al. | |
| 2020/0134950 A1* | 4/2020 | Colling | H01R 13/70 |

FOREIGN PATENT DOCUMENTS

| | | |
|---|---|---|
| JP | 2004-264915 A | 9/2004 |
| JP | 2007-094493 A | 4/2007 |
| JP | 2008-181462 A | 8/2008 |
| JP | 4832376 B2 | 12/2011 |
| JP | 5114779 B2 | 1/2013 |
| JP | 2015-187840 A | 10/2015 |
| JP | 6341491 B1 | 6/2018 |
| JP | 2019-525282 A | 9/2019 |
| KR | 10-2012770 B1 | 8/2019 |
| WO | WO 2014/187848 A1 | 11/2014 |

OTHER PUBLICATIONS

Extended Search Report issued on Sep. 28, 2023, in corresponding European Application No. 20892666.7, 14 pages.
International Search Report issued Feb. 2, 2021 in PCT/JP2020/043430 filed on Nov. 20, 2020, 5 pages.
Ministry of Internal Affairs and Communications "Smart IoT Promotion Strategy" Information and Communication Technology Subcommittee, Technology Strategy Committee Second Interim Report (Draft) (Separate vol. 1), Chapter 4, Promotion Measures by Field, Section 1 Advanced Promotion measures in the IoT field, http://www.soumu.go.jp/main_content/000439133.pdf, Jun. 14, 2016, 95 pages (with English Machine Translation).

* cited by examiner

APPROVAL SYSTEM

CROSS REFERENCE TO RELATED APPLICATIONS

This application is a Continuation Application of PCT Application No. PCT/JP2020/043430, filed Nov. 20, 2020 and based upon and claiming the benefit of priority from Japanese Patent Application No. 2019-213470, filed Nov. 26, 2019, and Japanese Patent Application No. 2020-036911, filed Mar. 4, 2020, the entire contents of all of which are incorporated herein by reference.

FIELD

Embodiments described herein relate generally to an approval system.

BACKGROUND

In recent years, not only a system having a direct relationship between some kind of sensor device and its control device, but also a system that performs predetermined processing in response to a sensor signal from a sensor device that is a terminal device in the so-called IoT (Internet of Things), have been provided. When such a system determines that a predetermined state (e.g., a fire) has occurred based on a signal from the sensor device, the system performs predetermined processing (e.g., activation of a sprinkler, etc.) corresponding to that state.

However, conventionally, in the above-described system, some kind of actuation is performed using a result of sensing by the sensor device, and it is difficult to ensure the appropriateness of performing predetermined processing.

DETAILED DESCRIPTION

According to one embodiment, an approval system includes an information processing apparatus and a biometric authentication device. The information processing apparatus includes a first interface and a first processor. The first processor is configured to: receive a sensor signal from the sensor device; when a state satisfying a predetermined condition related to data indicated by the sensor signal occurs, transmit an approval request signal requesting approval to the biometric authentication device; and perform the countermeasure processing when an approval response signal is received from the biometric authentication device. The biometric authentication device includes a second interface, a storage unit, a biometric sensor, a second processor. The second processor is configured to: cause the biometric sensor to acquire the biometric information when the approval request signal is received; and transmit the approval response signal to the information processing apparatus when the biometric information acquired by the biometric sensor and the biometric information stored in the storage unit are identified with each other.

Hereinafter, embodiments will be described with reference to the drawings. The drawings are schematic diagrams illustrating the embodiment and promoting an understanding thereof, and the shapes, dimensions, ratios, etc. may be changed as appropriate.

First Embodiment

First, a first embodiment will be described.

An approval system according to the embodiment determines whether or not a predetermined state (which may be any state, for example, an anomaly of a sensing target, a fire, etc.) occurs based on a sensor signal from a sensor device such as an IoT device. If it is determined that the predetermined state occurs, the approval system performs approval processing for performing predetermined processing (e.g., stopping of a system related to a sensing target, activation of a sprinkler, etc.). When the approval is successful, the approval system performs the predetermined processing.

Figure 1:
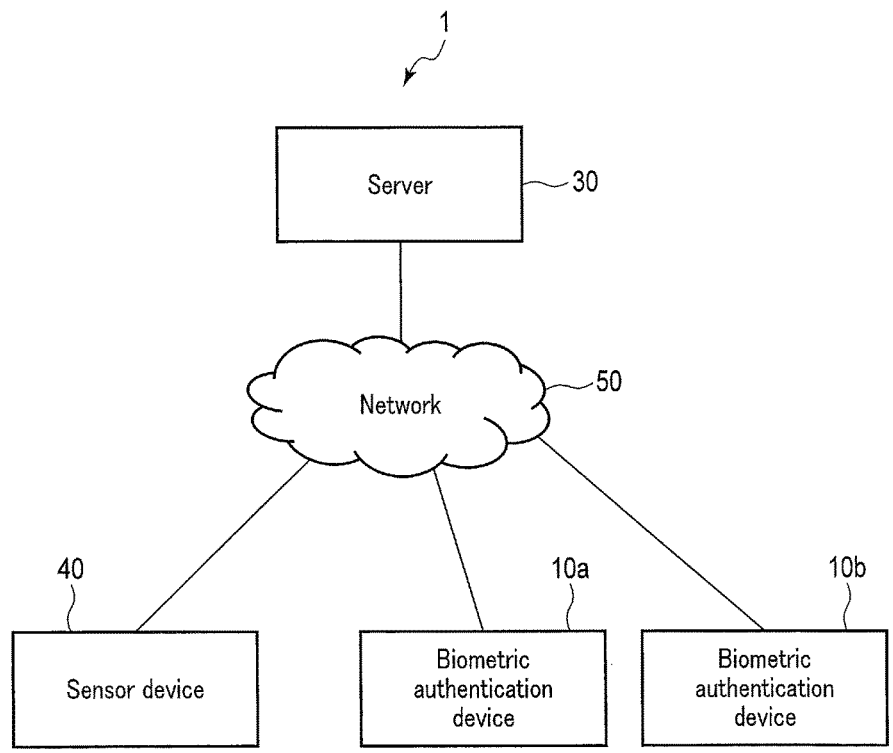
FIG. 1 is a block diagram showing a configuration example of an approval system according to a first embodiment.

FIG. 1 is a block diagram showing a configuration example of an approval system 1 according to the embodiment. As shown in FIG. 1, the approval system 1 includes biometric authentication devices 10 (10*a* and 10*b*), a server 30, a sensor device 40, a network 50, etc. The biometric authentication devices 10, the server 30, and the sensor device 40 are connected to the network 50.

In addition to the configuration shown in FIG. 1, the approval system 1 may further include a configuration as necessary, or a specific configuration may be excluded from the approval system 1.

The server 30 (information processing apparatus) controls the entire approval system 1. The server 30 determines whether or not a predetermined state occurs based on a sensor signal from the sensor device 40. If it is determined that the predetermined state occurs, the server 30 causes the biometric authentication device 10 to perform approval processing. When the approval is successful, the server 30 performs predetermined processing according to the predetermined state. The server 30 will be described in detail later.

The biometric authentication device 10 performs the approval processing under the control of the server 30. The biometric authentication device 10 authenticates a user using biometric information (here, a fingerprint) from the user. The biometric authentication device 10 transmits an approval result according to an authentication result of the user to the server 30. The biometric authentication device 10 will be described in detail later.

In the embodiment, the approval system 1 includes the biometric authentication devices 10a and 10b. The number of biometric authentication devices 10 included in the approval system 1 is not limited to a specific number.

The sensor device 40 is a device that acquires predetermined data. For example, the sensor device 40 acquires data such as temperature, humidity, sound, light amount, acceleration, inclination, image, or odor. The sensor device 40 transmits a sensor signal indicating the acquired data to the server 30 via the network 50. In some cases, the sensor device 40 may be provided so as to be able to communicate with a server without going through the network 50.

The sensor device 40 is installed not only on a building or a street but also in a predetermined place where an amount of a substance to be sensed by the sensor device 40 changes. The sensor device 40 acquires data around a place where the sensor device 40 is installed. For example, the sensor device 40 is an IoT (Internet to Thing) device or a device called an end point.

The approval system 1 may include a plurality of sensor devices 40.

The network 50 is a communication network for transmitting and receiving data. For example, the network 50 is the Internet. Further, the network 50 may be an independent communication network.

Next, the biometric authentication device 10 will be described.

Since the biometric authentication devices 10a and 10b have the same configuration, they will be described as a biometric authentication device 10.

Figure 2:
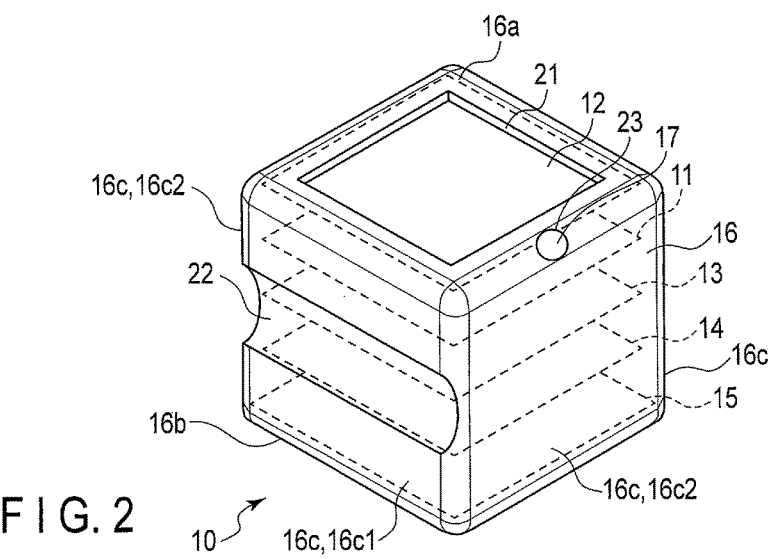
FIG. 2 is a perspective view showing a configuration example of a biometric authentication device according to the first embodiment.
Figure 3:
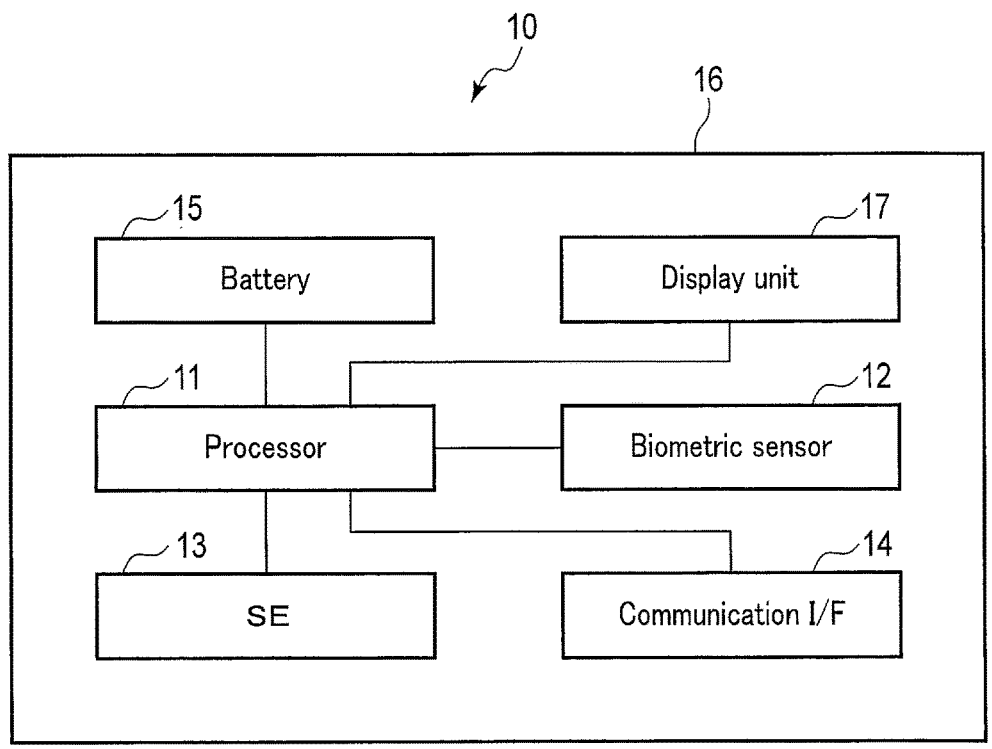
FIG. 3 is a block diagram showing a configuration example of the biometric authentication device according to the first embodiment.
Figure 4:
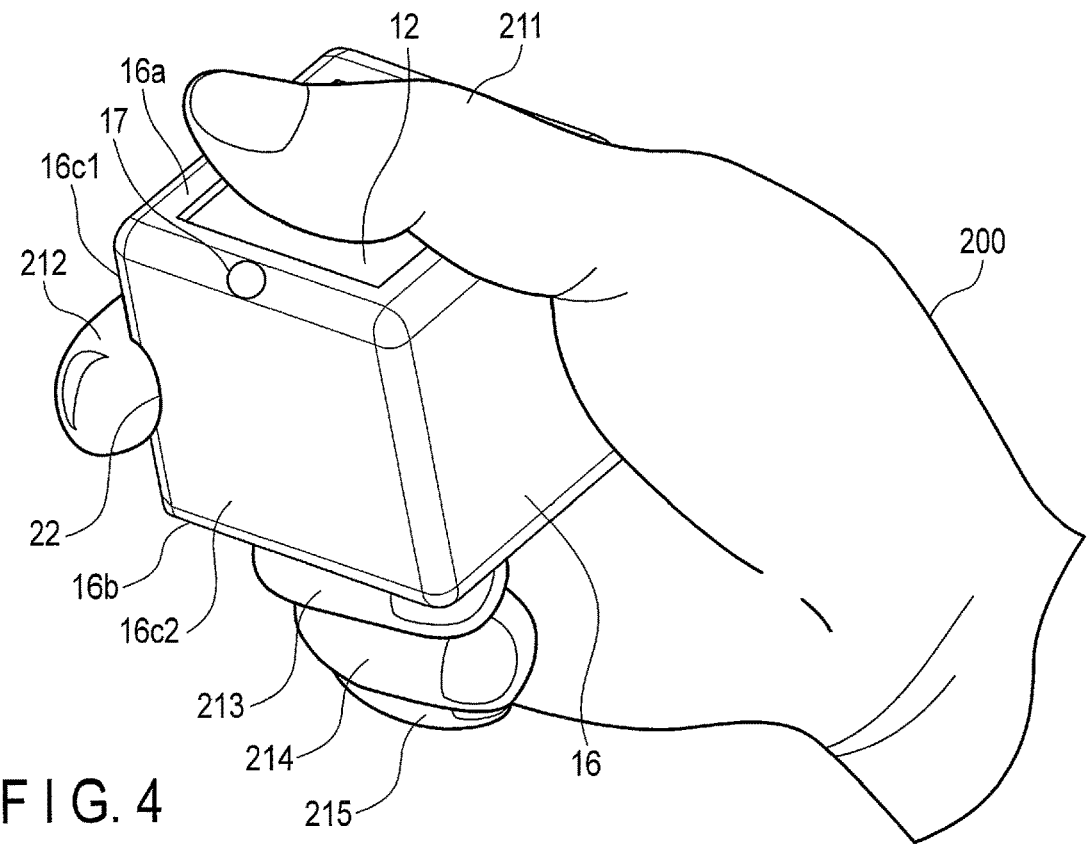
FIG. 4 is a perspective view showing an example of use of the biometric authentication device according to the first embodiment.

FIG. 2 is a perspective view showing a configuration example of the biometric authentication device 10. FIG. 3 is a block diagram showing a configuration example of the biometric authentication device 10. FIG. 4 is a perspective view showing an example of use of the biometric authentication device 10 in which the user holds the biometric authentication device 10 with his/her right hand and the biometric authentication device 10 acquires biometric authentication information from a thumb 211.

As shown in FIGS. 2 and 3, the biometric authentication device 10 includes a processor 11, a biometric sensor 12, an SE (secure element) 13, a communication interface 14, a battery 15, and a display unit 17. As shown in FIGS. 2 to 4, the biometric authentication device 10 includes a housing 16 that houses the processor 11, the SE 13, the communication interface 14, and the battery 15, and exposes the biometric sensor 12 and the display unit 17 to the outside.

The processor 11 performs processing and control necessary for the operation of the biometric authentication device 10. The processor 11 implements various functions of the biometric authentication device 10 based on, for example, a program stored in the SE 13. The processor 11 controls the biometric sensor 12, the SE 13, and the communication interface 14. For example, the processor 11 verifies biometric information acquired by the biometric sensor 12 against biometric information registered in advance, by the SE 13.

The processor 11 (second processor) is, for example, a micro processing unit (MPU). Note that the processor 11 may be a central processing unit (CPU), a system on a chip (SoC), a digital signal processor (DSP), or a graphics processing unit (GPU). Alternatively, the processor 11 may be a combination thereof.

The biometric sensor 12 acquires a fingerprint from any finger as biometric information of the user.

The biometric sensor 12 transmits the fingerprint acquired from the finger as image data to the SE 13. Note that the biometric sensor 12 may acquire data other than the fingerprint, and may be, for example, a vein sensor that acquires a vein pattern of a finger as image data.

The SE 13 (storage unit) includes a memory that can store data, an encryption logic circuit, etc.

The SE 13 stores biometric information (here, a fingerprint) registered in advance and data of a feature point extracted from the biometric information. Hereinafter, the data of a feature point extracted from the biometric information will also be referred to as biometric information. Further, the biometric information may be encrypted and held in the SE 13.

Here, the SE 13 of the biometric authentication device 10a stores a fingerprint of a first user having a first authority as biometric information registered in advance. The SE 13 of the biometric authentication device 10b stores a fingerprint of a second user having a second authority as biometric information registered in advance.

The communication interface 14 (second interface) is an interface for connecting to the network 50. That is, the communication interface 14 is an interface for connecting to the server 30, etc. via the network 50. For example, the communication interface 14 may employ a wired or wireless interface conforming to various communication standards such as Ethernet (registered trademark), Wi-Fi, BLE, and LTE (registered trademark). The communication interface 14 can also be realized by a combination thereof.

The battery 15 supplies electric power to each unit of the biometric authentication device 10. The battery 15 is, for example, a secondary battery.

The display unit 17 displays various types of information based on control from the processor 11. For example, the display unit 17 is formed by a lamp.

The housing 16 is formed in a cubic shape that fits in the fingers of one hand. Here, the cubic shape that fits in the fingers of one hand is, for example, a hexahedron having a size that can be held by the fingers of one hand. In the present embodiment, the housing 16 is formed into, for example, a cubic shape having a size that fits into a sphere having a diameter of 7 cm, specifically, a cubic shape having 4 cm sides or less. The housing 16 has, for example, a ridge portion and a corner portion formed in a curved surface shape.

As shown in FIG. 2, the housing 16 accommodates, for example, the processor 11, the SE 13, the communication interface 14, and the battery 15, each of which is mounted on a substrate. In addition, the housing 16 accommodates a substrate on which the biometric sensor 12 and the display unit 17 are mounted, and exposes the biometric sensor 12 and the display unit 17 to a part of an outer surface of the housing 16. As a specific example, the housing 16 has an opening 21 that exposes the biometric sensor 12 on one surface. The housing 16 also has an opening 23 that exposes the display unit 17.

Further, the housing 16 has a groove 22 in a portion of the outer surface and at least a part of the positions with which fingers come into contact when a finger is brought into contact with the biometric sensor 12. For example, the groove 22 is provided at least at a position of the housing 16 with which a finger different from the finger in contact with the biometric sensor 12 among the fingers comes into contact.

The groove 22 is formed to have a depth that allows a finger to contact a bottom surface, for example. The bottom surface of the groove 22 is formed into a curved surface shape, for example. The shape of the groove 22 can be set as appropriate, and for example, the bottom surface may be formed into a planar shape. For example, the groove 22 has such a depth and shape that the ball of a finger comes into contact with the bottom surface of the groove 22 when the housing 16 is held by the fingers.

In the present embodiment, as shown in FIG. 2, for example, the groove 22 is provided on one of four surfaces adjacent to the surface of the housing 16 having the opening 21 that exposes the biometric sensor 12. The groove 22 is provided on a center side of one surface adjacent to the surface having the opening 21 in a direction orthogonal to the surface where the opening 21 is provided, and is extended along a direction parallel to the surface where the opening 21 is provided.

For example, the groove 22 is provided across two opposing surfaces adjacent to the surface of the housing 16 on which the groove 22 is provided and the surface having the opening 21. In other words, the groove 22 is provided between ridge portions formed by the surface having the groove 22, and two opposing surfaces adjacent to both the surface having the groove 22 and the surface having the opening 21, so as to cross the surface having the groove 22 in a direction parallel to the surface having the opening 21.

More specifically, when the surface where the opening 21 is provided is an upper surface 16a and a surface facing the upper surface 16a is a lower surface 16b, the groove 22 is provided on any one side surface 16c1 among four side surfaces 16c of the housing 16. In addition, the groove 22 extends in a direction orthogonal to a direction in which the upper surface 16a and the lower surface 16b of the housing 16 face each other, in other words, in a direction orthogonal to the vertical direction, and in a direction along the side surface 16c1 on which the groove 22 is provided. Further, the groove 22 extends to a pair of opposing side surfaces 16c2 adjacent to the side surface 16c1. As a result, when the side surface 16c2 is viewed from the front, a part of a side portion of each of the pair of side surfaces 16c2 and the side surface 16c1 on which the groove 22 extends is cut out to have a cross-sectional shape of the groove 22.

According to the biometric authentication device 10 having such a configuration, the groove 22 extending in the direction along the upper surface 16a on which the biometric sensor 12 is provided is provided on any one side surface 16c1 of four side surfaces 16c adjacent to the upper surface 16a where the biometric sensor 12 is exposed. Thus, as shown in FIG. 4, when the housing 16 is held by one of the right and left hands (in the present embodiment, fingers of a right hand 200) and the thumb 211 is brought into contact with the biometric sensor 12, an index finger 212 can be guided to the groove 22. When the index finger 212 is located in the groove 22, the position of the index finger 212 is guided by the groove 22, and for example, a middle finger 213, a ring finger 214, and a little finger 215 are disposed on the lower surface 16b side facing the upper surface 16a on which the biometric sensor 12 is provided. When the thumb 211 is brought into contact with the biometric sensor 12, the housing 16 is held by the thumb 211, the index finger 212, and the middle finger 213, and a predetermined region of the thumb 211 (in the embodiment, a part of a region of the thumb 211 that has the fingerprint) comes into contact with the biometric sensor 12.

That is, when a finger is located in the groove 22, a positional relationship of the other fingers with respect to the housing 16 is also determined. As a result, the groove 22 guides a positional relationship between the biometric sensor 12 and a finger in contact with the biometric sensor 12.

Next, the server 30 will be described.

Figure 5:
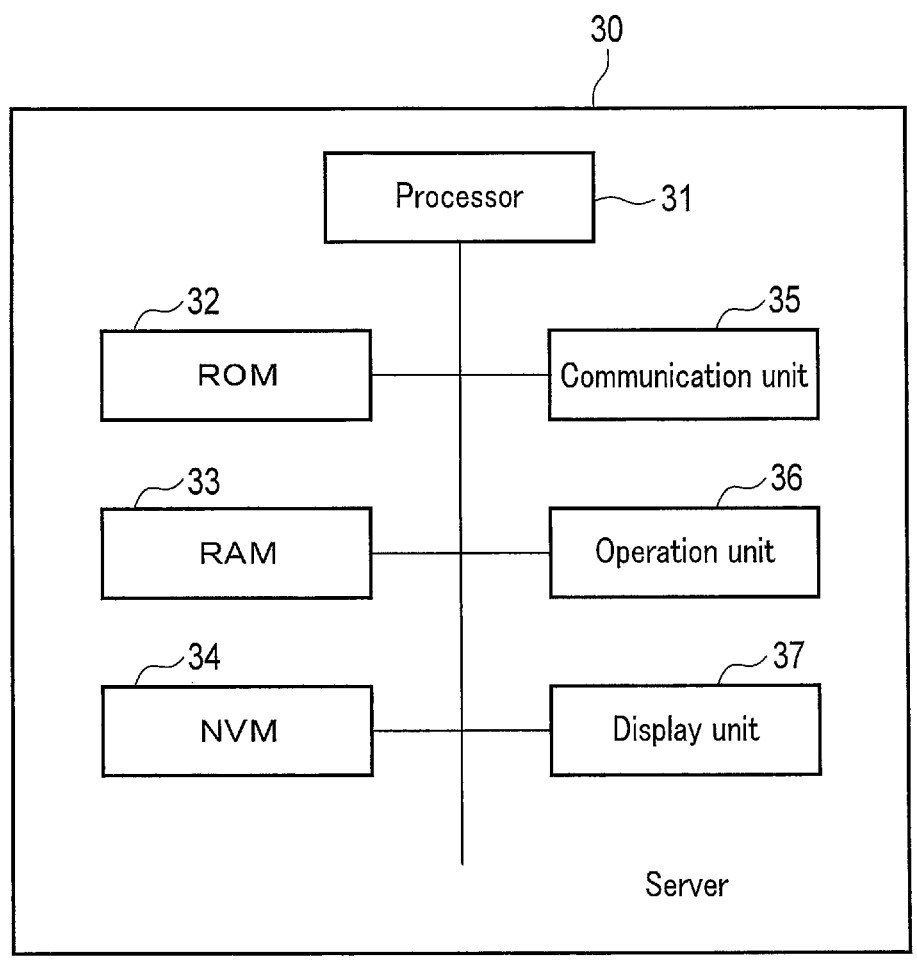
FIG. 5 is a block diagram showing a configuration example of a server according to the first embodiment.

FIG. 5 shows a configuration example of the server 30 according to the embodiment. FIG. 5 is a block diagram showing the configuration example of the server 30. As shown in FIG. 5, the server 30 includes a processor 31, a ROM 32, a RAM 33, an NVM 34, a communication unit 35, an operation unit 36, a display unit 37, etc.

The processor 31 is connected to each of the ROM 32, RAM 33, NVM 34, communication unit 35, operation unit 36, and display unit 37 via a data bus, etc.

The server 30 may include a configuration according to need in addition to the configuration shown in FIG. 5, or a specific configuration may be excluded from the server 30.

The processor 31 (first processor) has a function of controlling an overall operation of the server 30. The processor 31 may include an internal cache, various interfaces, etc. The processor 31 realizes various processing by executing programs stored in advance in an internal memory, the ROM 32, or the NVM 34.

Note that some of the various functions realized by the execution of the programs by the processor 31 may be realized by a hardware circuit. In this case, the processor 31 controls the functions performed by the hardware circuit.

The ROM 32 is a non-volatile memory in which a control program, control data, etc. are stored in advance. The control program and control data stored in the ROM 32 are incorporated therein in advance according to the specification of the server 30.

The RAM 33 is a volatile memory. The RAM 33 temporarily stores data being processed by the processor 31. The RAM 33 stores various application programs based on instructions from the processor 31. In addition, the RAM 33 may store data necessary for executing the application programs, execution results of the application programs, etc.

The NVM 34 is a non-volatile memory capable of writing and rewriting data. The NVM 34 includes, for example, a hard disk drive (HDD), a solid state drive (SSD), or a flash memory. The NVM 34 stores a control program, an application, various data, etc. depending on an operational use of the server 30.

The communication unit 35 (first interface) is an interface for connecting to the network 50. That is, the communication unit 35 is an interface for connecting to the biometric authentication device 10, the sensor device 40, etc. via the network 50. For example, the communication unit 35 supports a wired or wireless LAN connection.

The communication unit 35 may employ a wired or wireless interface conforming to various communication standards such as Ethernet, Wi-Fi, BLE, and LTE. In addition, the communication unit 35 can also be realized by a combination thereof. The communication unit 35 may include an interface for communicating with the sensor device 40 and an interface for communicating with the biometric authentication device 10.

The operation unit 36 receives inputs of various operations from an operator. The operation unit 36 transmits a signal indicating an input operation to the processor 31. The operation unit 36 may be formed by a touch panel.

The display unit 37 displays image data from the processor 31. For example, the display unit 37 is formed by a liquid crystal monitor. When the operation unit 36 is formed by a touch panel, the display unit 37 may be formed integrally with the operation unit 36.

For example, the server 30 is a desktop PC or a notebook PC, etc.

Next, functions realized by the biometric authentication device 10 will be described. The functions realized by the biometric authentication device 10 are realized by the processor 11 executing a program stored in the internal memory or the SE 13, etc.

First, the processor 11 has a function of receiving an approval request signal requesting approval through the communication interface 14.

The processor 11 receives an approval request signal by push notification from the server 30 through the communication interface 14. The processor 11 may also transmit a predetermined request to the server 30 through the communication interface 14 at a predetermined timing. The processor 11 may receive an approval request signal as a response to that request.

Further, the processor 11 has a function of causing the biometric sensor 12 to acquire biometric information when receiving the approval request signal.

Here, the biometric information is a fingerprint (image data of the fingerprint) of the user.

Upon receiving the approval request signal, the processor 11 displays on the display unit 17 guidance for prompting the user to bring a finger into contact with the biometric sensor 12. For example, the processor 11 causes the display unit 17 to light up in a predetermined color as that guidance. Further, the processor 11 may cause the display unit 17 to blink. The method by which the processor 11 displays that guidance is not limited to a specific method.

Here, it is assumed that the user (the first user or the second user) brings his/her finger into contact with the biometric sensor 12.

The biometric sensor 12 acquires a fingerprint from a finger in contact with the biometric sensor 12. The biometric sensor 12 transmits the acquired fingerprint to the SE 13.

The processor 11 also has a function of performing authentication processing based on a fingerprint acquired through the biometric sensor 12.

The processor 11 performs the authentication processing using the SE 13. As described above, the biometric sensor 12 transmits the acquired fingerprint to the SE 13. The SE 13 compares the pre-registered biometric information with the received fingerprint. For example, the SE 13 verifies feature points, etc. of the two. When the two are matched (identified) with each other, the SE 13 transmits to the processor 11 a signal (matching signal) indicating that the two match. In addition, if the two do not match, the SE 13 transmits to the processor 11 a signal (mismatching signal) indicating that the two do not match.

When receiving a matching signal from the SE 13, the processor 11 determines that the authentication is successful.

When it is determined that the authentication is successful, the processor 11 transmits to the server 30 a signal (approval response signal) indicating that the approval is successful as a response through the communication interface 14.

When the processor 11 receives a mismatching signal from the SE 13, the processor 11 determines that the authentication has failed. When it is determined that the authentication has failed, the processor 11 transmits to the server 30 a signal (rejection response signal) indicating that the approval has failed as a response through the communication interface 14.

Next, functions realized by the server 30 will be described. The function of the server 30 is realized by the processor 31 executing a program stored in the internal memory, the ROM 32, or the NVM 34, etc.

First, the processor 31 has a function of acquiring a sensor signal from the sensor device 40 through the communication unit 35.

For example, the processor 31 receives a sensor signal transmitted at predetermined intervals from the sensor device 40 through the communication unit 35.

Further, the processor 31 may transmit a predetermined request to the sensor device 40 through the communication unit 35. The processor 31 receives the sensor signal as a response to that request.

In addition, the processor 31 has a function of determining whether or not a state (a predetermined state) satisfying a predetermined condition occurs based on the acquired sensor signal.

The predetermined state is related to data (such as values of various parameters) indicated by the sensor signal. The predetermined state is not necessarily limited to an anomalous state, and refers to a state that requires confirmation or approval by a human once. A typical example of the predetermined state is a state in which it is determined that an anomaly has occurred based on data indicated by the sensor signal. For example, the predetermined state is a state in which a disaster such as a fire or an earthquake, an accident, an incident, etc. has occurred.

For example, in a case where the sensor signal indicates a temperature of a predetermined place, the processor 31 determines that a fire is occurring as the predetermined state when the temperature indicated by the sensor signal exceeds a predetermined threshold value.

Note that the predetermined state and the method by which the processor 31 determines the occurrence of the predetermined state are not limited to specific configurations.

In addition, the processor 31 has a function of determining the biometric authentication device 10 to perform approval processing when it is determined that the predetermined state occurs.

The processor 31 determines predetermined processing (countermeasure processing) corresponding to the predetermined state that has occurred.

The countermeasure processing is processing for dealing with a predetermined state when that predetermined state occurs. For example, in a case where the predetermined state is a fire, the countermeasure processing is activation of a sprinkler, interruption of a power source of a predetermined device, stopping of a system, issuance of an alarm, etc.

For example, the NVM 34 stores a table in which a state condition and countermeasure processing are associated with each other. The processor 31 determines countermeasure processing corresponding to a predetermined state that has occurred with reference to that table.

When the countermeasure processing is determined, the processor 31 determines an authority to perform the countermeasure processing. For example, the NVM 34 stores a table in which countermeasure processing and an authority are associated with each other. The processor 31 determines an authority to perform the countermeasure processing with reference to that table. Here, the processor 31 determines a first authority or a second authority as the authority to perform the countermeasure processing. Here, the first authority is an authority to perform a part of the countermeasure processing. The second authority is an authority to perform other countermeasure processing in addition to that part of the countermeasure processing. Note that the second authority may be an authority to perform all of the countermeasure processing.

The processor 31 may determine a plurality of authorities as authorities to perform countermeasure processing. For example, when the determined countermeasure processing can be performed with the first authority, the processor 31 may determine the first authority and the second authority as authorities to perform the determined countermeasure processing.

When the authority is determined, the processor 31 determines a biometric authentication device 10 corresponding to the determined authority as a biometric authentication device 10 to perform approval processing. That is, the processor 31 determines a biometric authentication device 10 capable of performing authentication processing of a user having the determined authority as the biometric authentication device 10 to perform the approval processing.

For example, in a case where the first authority is determined, the processor 31 determines the biometric authentication device 10a that stores the fingerprint of the first user having the first authority as the biometric authentication device 10 to perform the approval processing.

The processor 31 also has a function of transmitting an approval request signal to the determined biometric authentication device 10 through the communication unit 35.

When determining the biometric authentication device 10 to perform the approval processing, the processor 31 transmits an approval request signal to the determined biometric authentication device 10 through the communication unit 35.

In addition, the processor 31 has a function of performing countermeasure processing corresponding to the predetermined state that has occurred when receiving an approval response signal through the communication unit 35.

When receiving an approval response signal from the biometric authentication device 10 after transmitting the approval request signal to the biometric authentication device 10, the processor 31 performs the countermeasure processing. For example, the processor 31 transmits a signal performing the countermeasure processing to an external device.

For example, when the countermeasure processing is activation of a sprinkler, the processor 31 transmits a signal activating the sprinkler to a device for controlling the sprinkler through the communication unit 35, etc.

In a case of transmitting the approval request signal to a plurality of biometric authentication devices 10, the processor 31 performs the countermeasure processing if an approval response signal is received from at least one of the biometric authentication devices 10.

In addition, the processor 31 may perform the countermeasure processing when receiving an approval response signal from each of the biometric authentication devices 10. Further, the processor 31 may perform the countermeasure processing when receiving an approval response signal from a predetermined number or more of the biometric authentication devices 10.

When receiving a rejection response signal from the biometric authentication device 10 after transmitting the approval request signal to the biometric authentication device 10, the processor 31 outputs an error indicating that the approval has failed. For example, the processor 31 displays an error message on the display unit 37, etc.

Next, an operation example of the approval system 1 will be described.

Figure 6:
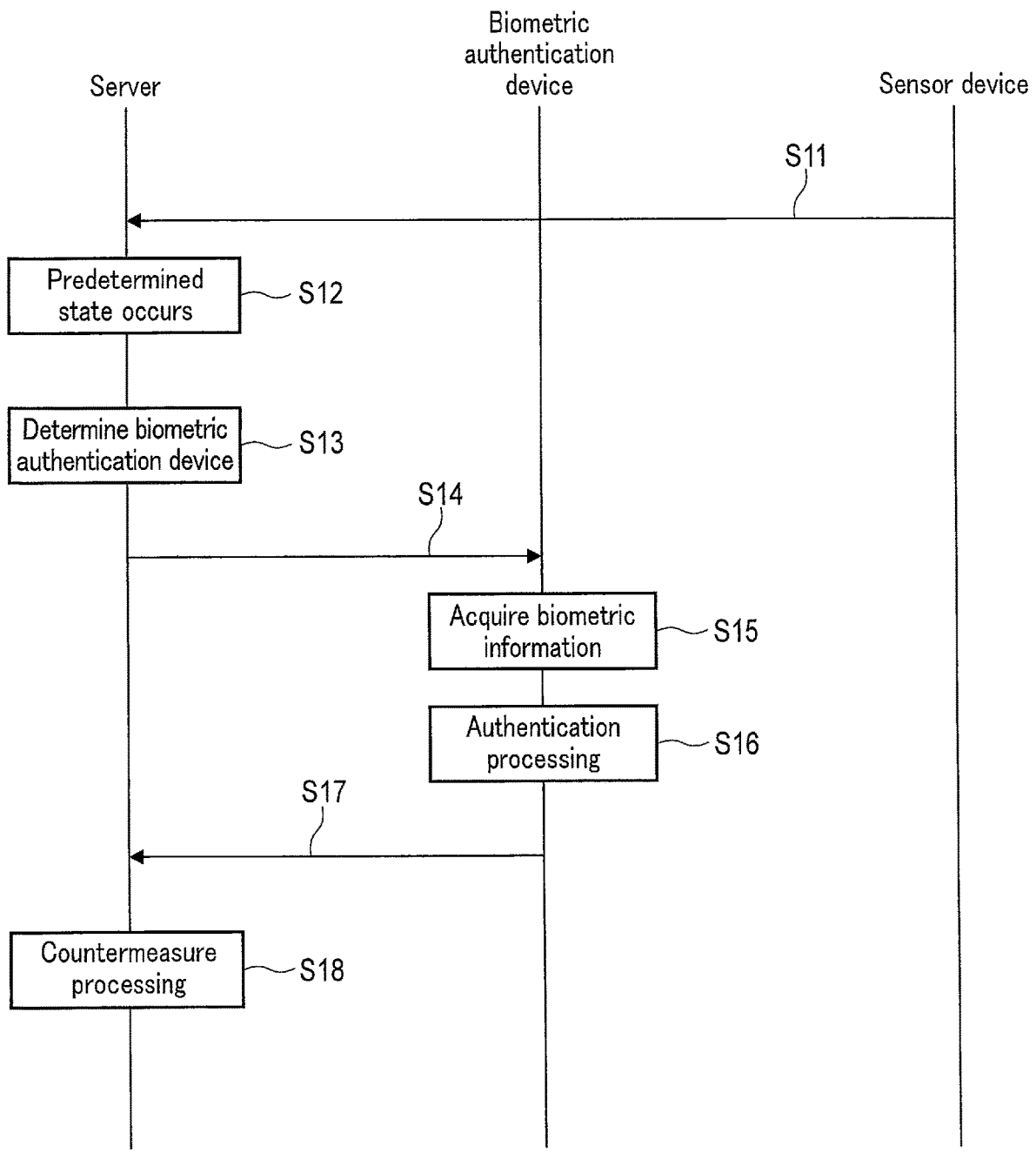
FIG. 6 is a sequence diagram showing an operation example of the approval system according to the first embodiment.

FIG. 6 is a flowchart for explaining the operation example of the approval system 1.

First, the sensor device 40 transmits a sensor signal to the server 30 (S11).

The processor 31 of the server 30 receives the sensor signal from the sensor device 40 through the communication unit 35. Here, the processor 31 determines that a predetermined state occurs based on the received sensor signal (S12).

When it is determined that the predetermined state occurs, the processor 31 determines a biometric authentication device 10 to perform approval processing (S13). When the biometric authentication device 10 to perform authentication processing is determined, the processor 31 transmits an approval request signal to the determined biometric authentication device 10 through the communication unit 35 (S14).

The processor 11 of the biometric authentication device 10 receives the approval request signal through the communication interface 14. Upon receiving the approval request signal, the processor 11 acquires biometric information through the biometric sensor 12 (S15).

When the biometric information is acquired, the processor 11 performs the authentication processing using the acquired biometric information (S16). Here, it is assumed that the processor 11 succeeds in authentication. When the authentication processing is performed, the processor 11 transmits an approval response signal to the server 30 through the communication interface 14 (S17).

The processor 31 of the server 30 receives the approval response signal from the biometric authentication device 10 through the communication unit 35. When the approval response signal is received, the processor 31 performs countermeasure processing (S18). When the processor 31 performs the countermeasure processing, the approval system 1 finishes the operation.

Next, an operation example of the server 30 will be described.

Figure 7:
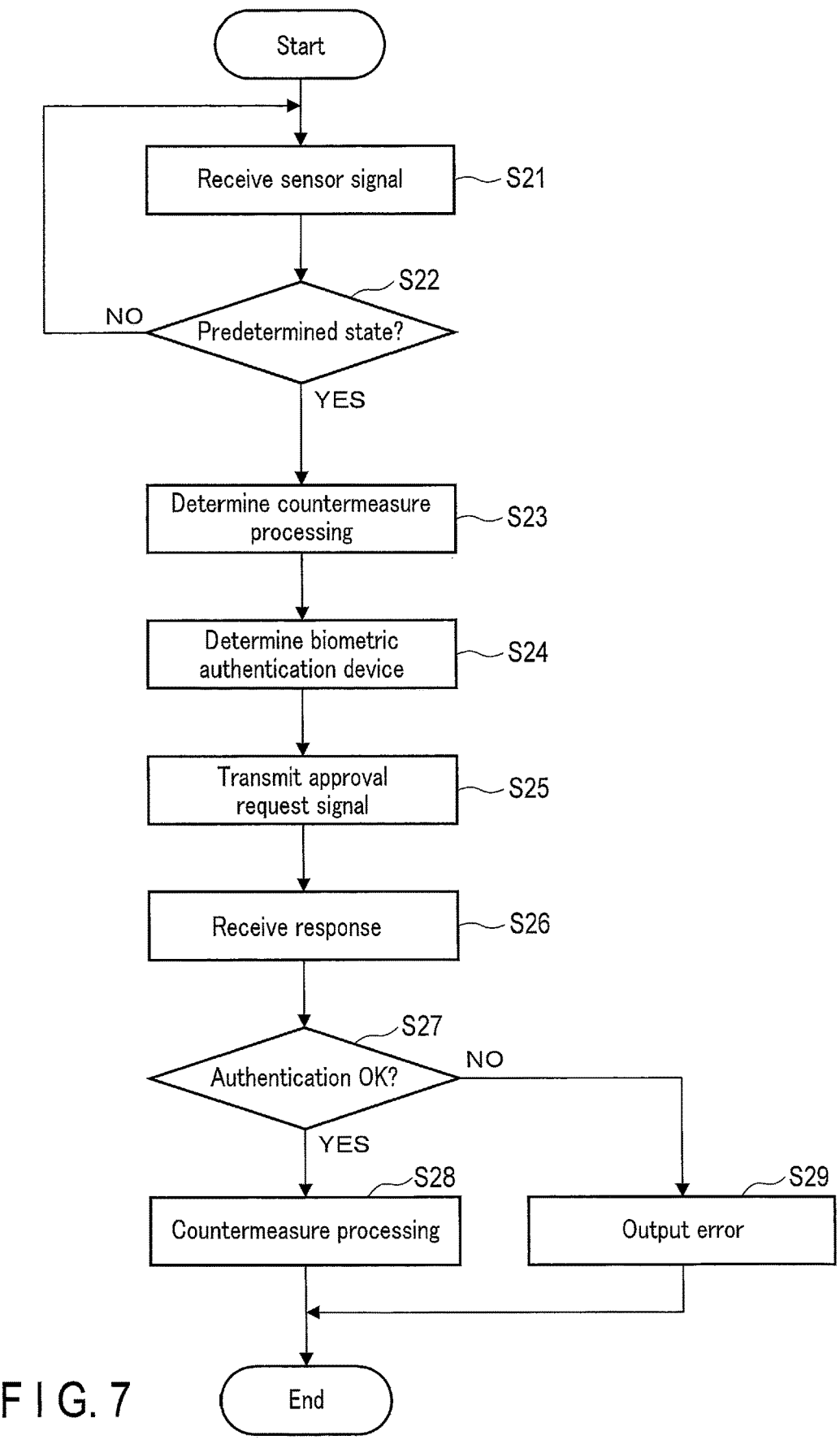
FIG. 7 is a flowchart showing an operation example of the server according to the first embodiment.

FIG. 7 is a flowchart for explaining the operation example of the server 30.

First, the processor 31 of the server 30 receives a sensor signal from the sensor device 40 through the communication unit 35 (S21). Upon receiving the sensor signal, the processor 31 determines whether or not a predetermined state occurs based on the sensor signal (S22).

If it is determined that the predetermined state does not occur (NO in S22), the processor 31 returns to S21.

If it is determined that the predetermined state occurs (YES in S22), the processor 31 determines countermeasure processing corresponding to the predetermined state that has occurred (S23). When the countermeasure processing is determined, the processor 31 determines a biometric authentication device 10 to perform authentication processing based on the determined countermeasure processing (S24).

When the biometric authentication device 10 is determined, the processor 31 transmits an approval request signal to the determined biometric authentication device 10 through the communication unit 35 (S25). When the approval request signal is transmitted, the processor 31 receives a response from the biometric authentication device 10 through the communication unit 35 (S26).

When the response is received, the processor 31 determines whether or not the response is an approval response signal (S27). When it is determined that the response is an approval response signal (YES in S27), the processor 31 performs the countermeasure processing (S28).

If it is determined that the response is not an approval response signal (the response is a rejection response signal) (NO in S27), the processor 31 outputs an error (S29).

When the countermeasure processing is performed (S28) or when the error is output (S29), the processor 31 finishes the operation.

When it is determined that the predetermined state occurs, the processor 31 of the server 30 may display information indicating the predetermined state that has occurred on the display unit 37, etc. In addition, when the countermeasure processing is determined, the processor 31 may display information indicating the determined countermeasure processing on the display unit 37, etc.

Further, the processor 31 may present the predetermined state that has occurred or the determined countermeasure processing to the user whose fingerprint is acquired by the biometric authentication device 10 to which the approval request signal is transmitted. For example, the processor 31 may transmit information indicating the predetermined state that has occurred or the determined countermeasure processing to a terminal held by that user. The processor 31 may also cause the biometric authentication device 10 to display the predetermined state that has occurred or the determined countermeasure processing.

The processor 31 may also store the approval request signal and the approval response signal (or the rejection response signal) as an operation log in the NVM 34. Further, the processor 31 may store the approval request signal and the approval response signal (or the rejection response signal) in a predetermined external device.

When the approval system formed as described above determines that a predetermined state occurs based on a sensor signal from the sensor device, the approval system causes the biometric authentication device to perform approval processing before performing processing corresponding to that state. The approval system performs that processing when the approval by the biometric authentication device is successful, that is, after it can be confirmed that the approval is of a person who is eligible for approval. As a result, the approval system can ensure the appropriateness of performing that processing. In the first embodiment, approval propriety is directly requested from the server to the biometric authentication device. However, approval may be requested to a mobile device such as a mobile phone through communication via a mobile line or communication via Wi-Fi, approval propriety may be requested to a biometric authentication device capable of separately communicating via Bluetooth (registered trademark) using an app of that mobile device, and a result thereof may be returned to the server. In this way, a system can be realized in which, by simply installing an app on a mobile device, even if different OSs provided by various carriers are installed on the mobile device, approval propriety can be incorporated into a part of a determination process by biometric authentication software incorporated in the mobile device or a separately provided biometric authentication device.

Second Embodiment

Next, a second embodiment will be described.

An approval system according to a second embodiment is different from that of the first embodiment in that the biometric authentication device 10 controls the IoT device. Therefore, the other points are denoted by the same reference signs, and detailed descriptions thereof will be omitted.

Similarly, a description of an effect that can be derived from the configuration of the first embodiment will be omitted here.

The approval system according to the second embodiment is a system for a person (a treating person) who gives predetermined treatment such as care, nursing, or medical treatment to explicitly indicate a person (a person to be treated) who receives that predetermined treatment.

For example, the approval system may be used in a hospital, a sanatorium, or a care facility.

Figure 8:
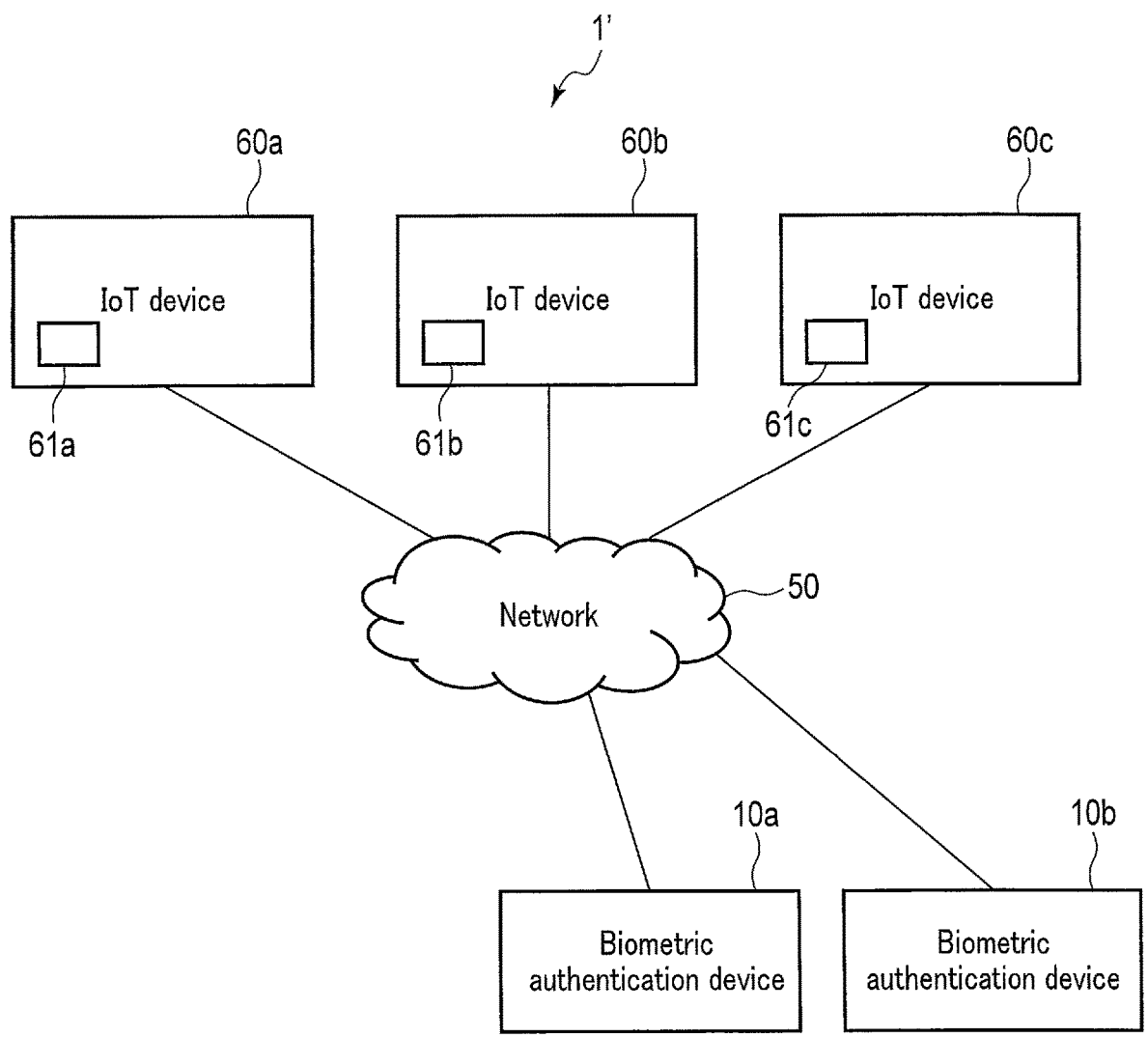
FIG. 8 is a block diagram showing a configuration example of an approval system according to a second embodiment.

FIG. 8 is a block diagram showing a configuration example of an approval system 1' according to the second embodiment. As shown in FIG. 8, the approval system 1' includes the biometric authentication devices 10 (10a and 10b), the network 50, IoT devices 60 (60a to 60c), etc. The biometric authentication devices 10 and the IoT devices 60 are connected to the network 50.

In addition to the configuration shown in FIG. 8, the approval system 1' may further include a configuration as necessary, or a specific configuration may be excluded from the approval system 1'.

The IoT devices 60a to 60c include lamps 61a to 61c each formed of an LED, etc. Since the IoT devices 60a to 60c have the same configuration, they will be described as the IoT device 60. Since the lamps 61a to 61c have the same configuration, they will be described as the lamp 61.

The IoT device 60 operates in response to a control signal from the biometric authentication device 10. That is, the IoT device 60 turns on or off the lamp 61 based on the control signal from the biometric authentication device 10.

When receiving a control signal (a lighting signal) instructing lighting of the lamp 61 from the biometric authentication device 10 through the network 50, the IoT device 60 lights the lamp. The IoT device 60 may maintain the lighting of the lamp until receiving a control signal instructing it to turn off the lamp. Further, the IoT device 60 may turn off the lamp when a predetermined time elapses after the lamp is turned on.

The IoT devices 60a to 60c correspond to predetermined persons to be treated, respectively. For example, the IoT devices 60a to 60c indicate positions where the persons to be treated are present, respectively. For example, the IoT devices 60a and 60c are installed near positions where beds or seats, etc. of the persons to be treated are present, respectively. That is, the IoT devices 60a to 60c indicate the presence of the persons to be treated corresponding thereto by turning on the lamps 61a to 61c, respectively.

Here, the approval system 1' includes the three IoT devices 60a to 60c. The IoT devices 60a to 60c are installed at positions where predetermined persons to be treated a to c are present, respectively.

Next, functions realized by the biometric authentication device 10 will be described. The function of the biometric authentication device 10 is realized by the processor 11 executing a program stored in the internal memory or the SE 13, etc.

The processor 11 realizes the following function in addition to the functions realized in the first embodiment.

The processor 11 has a function of transmitting a lighting signal to the IoT device 60 through the communication interface 14 when authentication is successful.

Here, the communication interface 14 is an interface for communicating with the IoT device 60, etc. via the network 50.

In addition, the processor 11 causes the SE 13 to perform authentication processing even if an approval request signal is not received. That is, when a finger comes into contact with the biometric sensor 12, the processor 11 causes the biometric sensor 12 to acquire a fingerprint. The processor 11 causes the SE 13 to perform the authentication processing using the acquired fingerprint.

When the authentication is successful, the processor 11 transmits a lighting signal to the IoT device 60 via the network 50.

The processor 11 transmits the lighting signal to a predetermined IoT device 60. That is, the processor 11 transmits a lighting signal to an IoT device 60 corresponding to a person to be treated who is treated by a treating person who carries the biometric authentication device 10.

For example, in a case where a treating person who carries the biometric authentication device 10*a* gives the persons to be treated a and b treatment, the processor 11 of the biometric authentication device 10*a* transmits a lighting signal to the IoT devices 60*a* and 60*b* (the IoT devices 60 corresponding to the persons to be treated a and b) when authentication is successful.

When authentication fails, the processor 11 may output an error. For example, the processor 11 may turn on the display unit 17 as an error. Further, the processor 11 may transmit a predetermined signal as an error to an external device.

Next, an operation example of the biometric authentication device 10 will be described.

Figure 9:
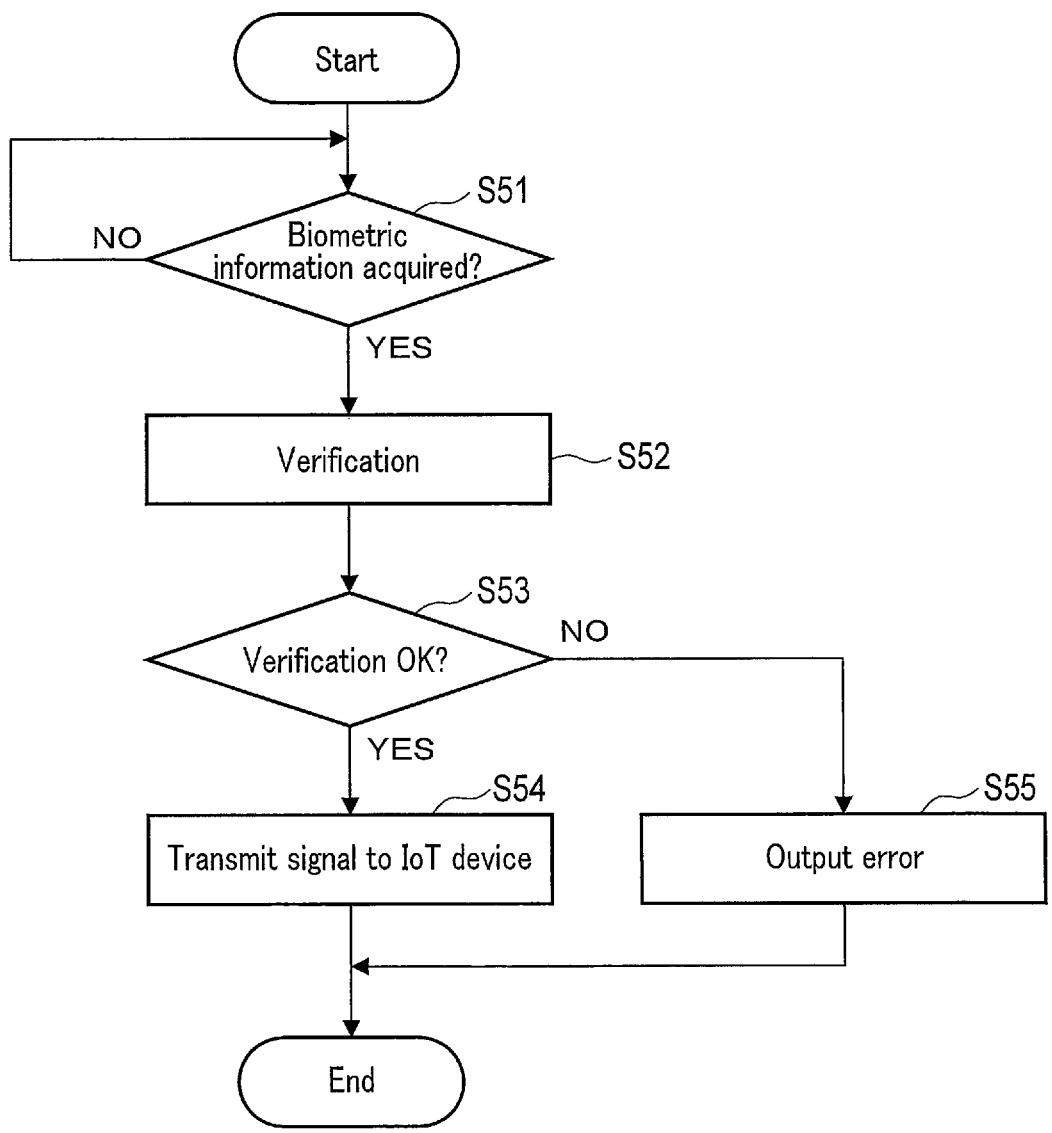
FIG. 9 is a flowchart showing an operation example of a biometric authentication device according to the second embodiment.

FIG. 9 is a flowchart for explaining the operation example of the biometric authentication device 10.

First, the processor 11 of the biometric authentication device 10 determines whether or not the biometric sensor 12 acquires a fingerprint (S51). That is, the processor 11 determines whether or not a finger comes into contact with the biometric sensor 12.

If it is determined that the biometric sensor 12 does not acquire a fingerprint (NO in S51), the processor 11 returns to S51.

If it is determined that the biometric sensor 12 acquires a fingerprint (YES in S51), the processor 11 causes the SE 13 to verify the fingerprint acquired by the biometric sensor 12 against a fingerprint registered in advance (S52).

If the SE 13 succeeds in verification (YES in S53), the processor 11 transmits a lighting signal to a predetermined IoT device 60 through the communication interface 14 (S54). If the SE 13 fails in verification (NO in S53), the processor 11 outputs an error (S55).

When the lighting signal is transmitted to the predetermined IoT device 60 (S54) or when the error is output (S55), the processor 11 finishes the operation.

Note that the biometric authentication device 10 may store fingerprints of a plurality of treating persons in advance. In this case, the SE 13 of the biometric authentication device 10 specifies a treating person who matches the acquired fingerprint. The processor 11 transmits a lighting signal to an IoT device 60 corresponding to a person to be treated who is treated by the treating person who matches the acquired fingerprint.

The biometric authentication device formed as described above transmits a control signal to a predetermined IoT device when fingerprint verification is successful. As a result, the biometric authentication device can control the IoT device corresponding to a user after authenticating that user.

In addition, after authenticating a treating person as a user, the biometric authentication device transmits a lighting signal to an IoT device corresponding to a person to be treated who is treated by that treating person. As a result, the biometric authentication device can clearly indicate the person to be treated who is treated by that treating person.

Therefore, the biometric authentication device can prevent a mix-up of persons to be treated. In this configuration according to the second embodiment, the IoT device operates in response to a control signal from the biometric authentication device. However, the IoT device may issue a command to the biometric authentication device via the network so as to encourage the biometric authentication device to perform biometric authentication, and the biometric authentication device may perform biometric authentication in response to the command. With such a configuration, the biometric authentication device can clearly indicate the person to be treated who is treated by that treating person by an action from the IoT device side when necessary. Furthermore, although the second embodiment is configured to turn on a lamp on the IoT device side, the same effect as that of the lamp can be expected in a case where, instead of the lamp, an authentication result display means that allows the user to know a result of biometric authentication is provided in the IoT device or a peripheral device thereof.

Third Embodiment

Next, a third embodiment will be described.

An approval system according to the third embodiment is different from that of the first embodiment in that biometric information of a plurality of users is registered in the biometric authentication device 10. Therefore, other points are denoted by the same reference signs, and detailed descriptions thereof will be omitted. Similarly, a description of an effect that can be derived from the configuration of the first embodiment will also be omitted here.

The SE 13 of the biometric authentication device 10 stores biometric information of a plurality of users. Here, the SE 13 stores a fingerprint of a first user having a first authority and a fingerprint of a second user having a second authority as the biometric information of a plurality of users.

Note that the approval system 1 may include one biometric authentication device 10.

Next, functions realized by the server 30 will be described. The function of the server 30 is realized by the processor 31 executing a program stored in the internal memory, the ROM 32, or the NVM 34, etc.

The processor 31 realizes the following function in addition to the functions realized in the first embodiment.

The processor 31 has a function of transmitting an approval request signal requesting approval by a determined authority to the biometric authentication device 10 through the communication unit 35.

That is, the approval request signal requests authentication processing of a user having an authority to perform countermeasure processing.

For example, when determining the first authority as an authority to perform countermeasure processing, the processor 31 transmits an approval request signal requesting approval by the first authority to the biometric authentication device 10.

That is, the processor 31 transmits an approval request signal requesting authentication processing of the first user having the first authority to the biometric authentication device 10.

When a plurality of authorities are determined as authorities for performing countermeasure processing, the processor 31 transmits an approval request signal requesting approval by any one of the plurality of determined authorities to the biometric authentication device 10.

Next, functions realized by the biometric authentication device 10 will be described. The function of the biometric authentication device 10 is realized by the processor 11 executing a program stored in the internal memory or the SE 13, etc.

The processor 11 realizes the following function in addition to the functions realized in the first embodiment.

The processor 11 has a function of performing authentication processing based on a fingerprint acquired through the biometric sensor 12 according to an approval request signal.

The processor 11 performs the authentication processing using the SE 13. The SE 13 compares each piece of biometric information registered in advance with the fingerprint received from the biometric sensor 12. For example, the SE 13 verifies feature points of the two.

If biometric information matching the input fingerprint is present in the pre-registered biometric information, the SE 13 outputs a signal indicating a user of the matched biometric information to the processor 11.

If there is no matching biometric information, the SE 13 transmits a signal indicating that the received fingerprint is not registered as biometric information to the processor 11.

If a signal indicating that the received fingerprint is not registered as biometric information is acquired from the SE 13, the processor 11 determines that the authentication has failed. When it is determined that the authentication has failed, the processor 11 transmits a rejection response signal to the server 30 through the communication interface 14.

When the processor 11 acquires a signal indicating a user of matched biometric information from the SE 13, the processor 11 determines whether or not an authority of the user indicated by that signal and an authority from which the approval request signal requests approval are identical (matched). For example, the internal memory or the SE 13 of the processor 11 stores a table in which users and authorities are associated with each other. The processor 11 determines whether or not the two authorities are identical with reference to that table.

If the two authorities are identical, the processor 11 determines that the authentication is successful. When it is determined that the authentication is successful, the processor 11 transmits an approval response signal to the server 30 through the communication interface 14.

If the two authorities are not identical, the processor 11 determines that the authentication has failed. When it is determined that the authentication has failed, the processor 11 transmits a rejection response signal to the server 30 through the communication interface 14.

In a case where an approval request signal indicates a plurality of authorities, the processor 11 transmits an approval response signal to the server 30 if an authority of a user of matched biometric information and any one of the plurality of authorities are identical.

Further, a user may have a plurality of authorities. In this case, the processor 11 transmits an approval response signal to the server 30 if any one of the plurality of authorities of the user and an authority from which an approval request signal requests approval are identical.

Next, an operation example of the approval system 1 will be described.

Figure 10:
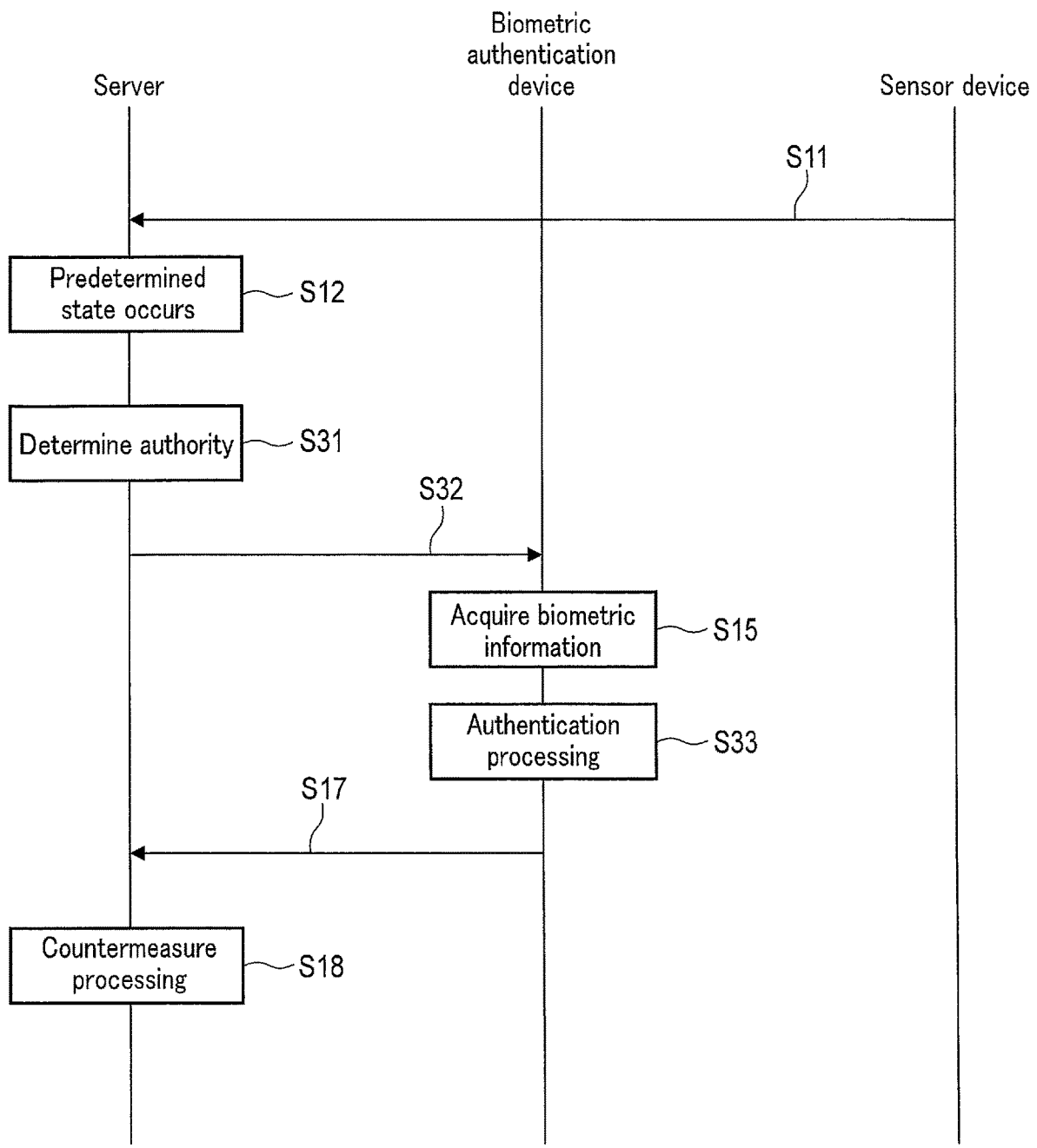
FIG. 10 is a sequence diagram showing an operation example of an approval system according to a third embodiment.

FIG. 10 is a flowchart for explaining the operation example of the approval system 1.

First, the sensor device 40 transmits a sensor signal to the server 30 (S11).

The processor 31 of the server 30 receives the sensor signal from the sensor device 40 through the communication unit 35. Here, the processor 31 determines that a predetermined state occurs based on the received sensor signal (S12).

When it is determined that the predetermined state occurs, the processor 31 determines an authority to perform countermeasure processing corresponding to the predetermined state (S31). When the authority is determined, the processor 31 transmits an approval request signal requesting approval by the determined authority to the biometric authentication device 10 through the communication unit 35 (S32).

The processor 11 of the biometric authentication device 10 receives the approval request signal through the communication interface 14. When the approval request signal is received, the processor 11 acquires biometric information through the biometric sensor 12 (S15).

When the biometric information is acquired, the processor 11 performs authentication processing in accordance with the approval request signal based on the acquired biometric information (S33). Here, it is assumed that the processor 11 succeeds in authentication. When the authentication processing is performed, the processor 11 transmits an approval response signal to the server 30 through the communication interface 14 (S17).

The processor 31 of the server 30 receives the approval response signal from the biometric authentication device 10 through the communication unit 35. When the approval response signal is received, the processor 31 performs countermeasure processing (S18). When the processor 31 performs the countermeasure processing, the approval system 1 finishes the operation.

Next, an operation example of the biometric authentication device 10 will be described.

Figure 11:
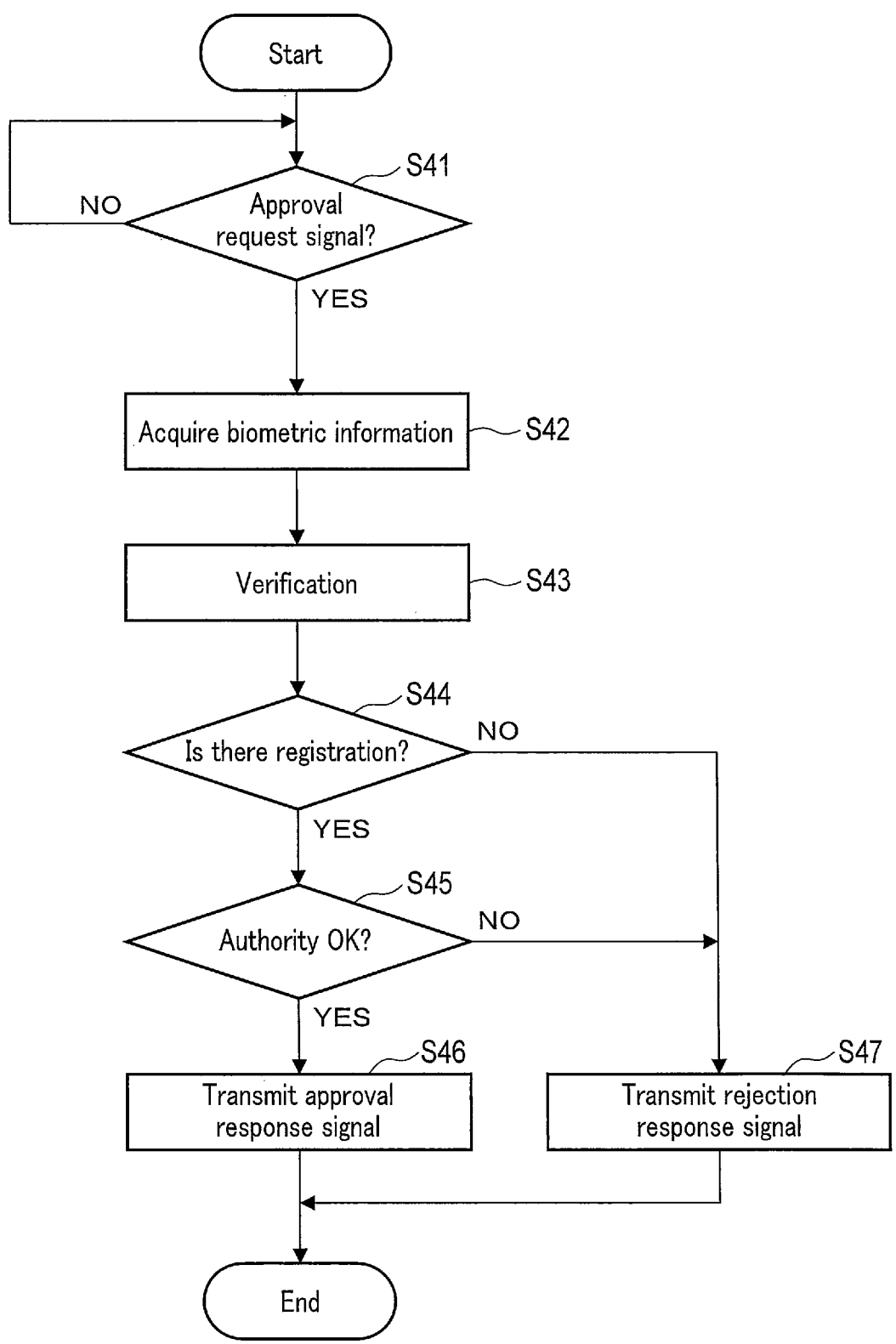
FIG. 11 is a flowchart showing an operation example of a biometric authentication device according to the third embodiment.

FIG. 11 is a flowchart for explaining the operation example of the biometric authentication device 10.

First, the processor 11 of the biometric authentication device 10 determines whether or not an approval request signal is received from the server 30 through the communication interface 14 (S41). If it is determined that the approval request signal is not received (NO in S41), the processor 11 returns to S41.

If it is determined that the approval request signal is received (YES in S41), the processor 11 causes the biometric sensor 12 to acquire a fingerprint (S42). When the fingerprint is acquired, the processor 11 causes the SE 13 to verify the fingerprint acquired by the biometric sensor 12 against a plurality of fingerprints registered in advance (S43).

If biometric information matching the fingerprint acquired by the biometric sensor 12 is registered (YES in S44), the processor 11 determines whether or not an authority of a user of the matched biometric information and an authority indicated by the approval request signal are identical (S45).

If it is determined that the two authorities are identical (YES in S45), the processor 11 transmits an approval response signal to the server 30 through the communication interface 14 (S46).

If biometric information matching the fingerprint acquired by the biometric sensor 12 is not registered (NO in S44) or if it is determined that the two authorities are not identical (NO in S45), the processor 11 transmits a rejection response signal to the server 30 through the communication interface 14 (S47).

When the approval response signal is transmitted to the server 30 (S46) or when the rejection response signal is transmitted to the server 30 (S47), the processor 11 finishes the operation.

The processor 11 of the server 30 may determine a biometric authentication device 10 in which biometric information of a user having a determined authority is registered. The processor 11 may transmit an approval request signal to the determined biometric authentication device 10.

The approval system formed as described above transmits an approval response signal based on an authority of a user authenticated by the biometric authentication device. As a result, the approval system does not need to manage the user's authority at the server.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An approval system comprising an information processing apparatus and a plurality of biometric authentication devices, wherein
    the information processing apparatus includes:
        a first storage unit storing a countermeasure processing-and-authority associating table;
        a first interface for connecting to a network and for communicating with a sensor device and the biometric authentication device via the network; and
        a first processor configured to:
            receive a sensor signal from the sensor device through the first interface;
            when a state satisfying a predetermined condition related to data indicated by the sensor signal occurs, determine countermeasure processing corresponding to the state, determine an authority to perform the countermeasure processing with reference to the countermeasure processing-and-authority associating table, determine a biometric authentication device to perform approval processing from among the plurality of biometric authentication devices based on the determined authority, and transmit an approval request signal requesting approval of the countermeasure processing corresponding to the state to the determined biometric authentication device through the first interface; and
            perform the countermeasure processing when an approval response signal indicating that the approval of the countermeasure processing is successful is received from the determined biometric authentication device through the first interface, and
    each of the plurality of biometric authentication devices includes:
        a second interface for connecting to the network and for communicating with the information processing apparatus via the network;
        a second storage unit configured to store biometric information in advance;
        a biometric sensor configured to acquire biometric information; and
        a second processor configured to:
            cause the biometric sensor to acquire the biometric information when the approval request signal is received; and
            transmit the approval response signal to the information processing apparatus through the second interface when the biometric information acquired by the biometric sensor and the biometric information stored in the second storage unit are identified with each other.

2. The approval system according to claim 1, wherein the first processor determines, from among the plurality of biometric authentication devices, the biometric authentication device that includes the first storage unit in which biometric information of a user having the authority to perform the countermeasure processing is stored in advance, the determined biometric authentication device performing the approval processing.

3. The approval system according to claim 1, wherein
    the first processor transmits through the first interface the approval request signal requesting approval by the authority to perform the countermeasure processing to the determined biometric authentication device, which has been determined from among the plurality of biometric authentication devices, and
    the second processor transmits the approval response signal to the information processing apparatus through the second interface when the authority to perform the countermeasure processing matches an authority of a user of the biometric information identified with the biometric information acquired by the biometric sensor.

4. The approval system according to claim 1, wherein the biometric information is a fingerprint.

5. The approval system according to claim 1, wherein the state is a state satisfying a condition for determining that an anomaly occurs based on the data indicated by the sensor signal.

* * * * *